(12) United States Patent
Blake et al.

(10) Patent No.: US 7,749,588 B2
(45) Date of Patent: *Jul. 6, 2010

(54) PROTECTIVE COVERINGS

(75) Inventors: Michael P. Blake, Macomb Township, MI (US); Raymond A. Blake, Armada, MI (US)

(73) Assignee: Sy Holdings, LLC, Mount Clemens, MI (US)

( * ) Notice: Subject to any disclaimer, the term of this patent is extended or adjusted under 35 U.S.C. 154(b) by 683 days.

This patent is subject to a terminal disclaimer.

(21) Appl. No.: 11/039,171

(22) Filed: Jan. 20, 2005

(65) Prior Publication Data

US 2005/0223650 A1 Oct. 13, 2005

Related U.S. Application Data

(60) Provisional application No. 60/537,568, filed on Jan. 20, 2004, provisional application No. 60/574,340, filed on May 25, 2004.

(51) Int. Cl.
  *B32B 3/12* (2006.01)
  *B32B 3/28* (2006.01)
  *A47K 3/02* (2006.01)
  *B65D 19/00* (2006.01)

(52) U.S. Cl. .................. 428/77; 428/118; 428/184; 428/192; 108/51.3; 4/580

(58) Field of Classification Search .................. 428/59, 428/77, 182, 184, 192, 116, 118; 108/51.3, 108/52.7; 52/35; 4/498, 580
See application file for complete search history.

(56) References Cited

U.S. PATENT DOCUMENTS 3,523,853 A * 8/1970 Thomas ...................... 156/354
6,996,860 B1 * 2/2006 Blake et al. .................... 4/580

* cited by examiner

*Primary Examiner*—Donald Loney
(74) *Attorney, Agent, or Firm*—Cargill & Associates, PLLC; Lynn E. Cargill, Esquire

(57) ABSTRACT

Protective covering for cabinets, appliances, and residential construction components of multi-layer sheeted materials capable of being die-cut into shapes and configurations suitable for protecting kitchen and bath countertops and appliances, home construction components, and desirable multi-layer configurations for various embodiments of the invention. Corrugated materials including paper and plastic are provided in sheets and may be combined with other layers of complementary materials, including plastic sheets, for extending downwardly to protect kitchen and bath cabinets and countertops from paint splashes and for covering air duct openings.

7 Claims, 12 Drawing Sheets

PROTECTIVE COVERINGS

CROSS REFERENCES TO RELATED APPLICATIONS

This application claims the benefit under 35 U.S.C. 119(e) of U.S. Provisional Application No. 60/537,568 filed on Jan. 20, 2004, and U.S. Provisional Application Ser. No. 60/574,340 filed on May 25, 2004.

BACKGROUND OF THE INVENTION

1. Field of the Invention

The present invention relates to protective coverings for construction sites and, more particularly, the invention relates to protective coverings for cabinets, construction components and appliances.

2. Description of the Prior Art

During the construction phase of all newly built and remodeled homes, preventable damage occurs which can average approximately $3,000.00 or more per home for repairs, replacements and cleaning. This preventable damage causes problems between builders and the homebuyers, in addition to causing unnecessary delays after construction occurs, and disruption of construction scheduling and processing and building closing dates.

Much of this damage occurs from scratches, nicks, dents, overspray of paint, caulk, adhesives, tracking in of dirt, and other contractor and construction worker-induced damage. The most common forms of damage occur as construction workers are working in and around partially or wholly finished portions of the construction with their tools, products and work-related paints, sprays and other construction materials.

For instance, once the bathroom components are installed (bathtub, shower, toilet and countertops), construction workers have to work around these appliances and cabinets in order to put up the drywall, paint the walls, install mirrors and other fixtures, all without trying to damage any of the previously installed bathroom components. It would be advantageous to provide a product and method in order to eliminate repair and replacement costs and additional post-construction cleaning costs. This would improve the builder's image, customer satisfaction and would ultimately increase the profit of the builder.

In that regard, it would be most advantageous to provide construction protective coverings which would be easy to install. It would also be advantageous to provide protection that could be easily modified to fit into specific places with commonly used tools such as a utility knife and tape.

Yet another problem arises because conventional construction of commercial and residential buildings and repairs tend to require a very exacting sequence of events. Among others, one reason for the critical timing of events in the construction process is because certain objects are easily blemished and costly to correct in terms of time and money. As mentioned above, once a structure is constructed, the finished surface of the structure is subjected to dropped tools, paint, adhesive and other objectionable contact. Objects which are especially sensitive to scratches, nicks and marring during the construction process are often composed of relatively delicate materials, such as kitchen countertops and appliances, molded fiberglass, steel, marble and precious woods, used in counters, sinks, bathtubs, basins, toilets, bidets, shower stalls, countertops and fireplace areas, and the like. Such items are often scratched, nicked or marred after their installation in, and during the construction or repair of, houses, buildings, boats, swimming pools, aircrafts and similar structures.

Currently construction workers often protect precious finished surfaces by utilizing techniques that are ineffective. In the past, construction workers have tried using protective materials including drop clothes, towels, bed linen and plywood to protect precious finished surfaces, although they have met with limited effectiveness. While these devices may fulfill their respective, particular objectives and requirements, as protective coverings they can pose dangers to the appearance and value of the precious finished surfaces and may compromise the safety of the construction workers.

Previously, construction workers would utilize the packaging materials from products that had been delivered to the site, but these packaging materials were ineffective and did not suit the application. Such protective coverings needed to be modifiable to fit a cabinet, a vanity or an island in bathroom and/or kitchens, and would be most advantageous if a simple utility knife and tape could be utilized to protect all of the previously installed components.

Furthermore, builders have found that there are not many products on which they can encourage brand name recognition by displaying their names. The proposed protective coverings of the present invention could also be used as marketing tools, as they may be effective billboards for the name of the builder, which can be removed after the home has been moved into. This billboard effect may also help to give a place for warnings for the construction workers, such as "Stop: Do-Not-Use". Moreover, if the construction protective coverings of the present invention would also suffice as a sturdy work surface in covering the various bathroom and/or kitchen, etc., components, the advantages could be doubly realized. The addition of textured or ribbed surfaces onto any of the protective coverings of the present invention may also add to the safety of the workers when utilizing the construction protective coverings described herein.

The present invention substantially departs from the conventional concepts and designs of current products on the market, and in so doing provides an apparatus primarily developed for the purpose of covering precious finished surfaces during construction or repair. This present invention serves as a shield to prevent objects from coming in contact with the precious finished surface and a platform from which contractors may work. The protective covering of the present invention is reusable, durable and helps to minimize cleaning and repair expenses during and after construction.

It is an aspect of the present invention to provide a new, more protective temporary construction site protective covering that can either be disposable or reused. It is also an aspect of the present invention to utilize modern double-skinned materials and integral protective apron which are much easier to custom fit with a simple utility knife, as well as to provide more durable coverings than prior art coverings. Protective coverings that are capable of holding at least 500 pounds so that heavy weight construction workers can be supported on top of the counter or appliance would be most advantageous.

It is yet another aspect of the present invention to provide a plastic sheet skirted protective covering that will be capable of being disposable and lightweight. Further still, the protective covering would be most advantageous if it could be made of a double skinned material with a plastic sheet extending therefrom which is lightweight and is capable of protecting the delicate finish of the previously installed material from nicks and scratches made by careless use of construction tools, boots, and the like.

Therefore, there are described herein a collection of construction protective coverings including protective coverings for kitchen and bath countertops, toilets, air duct vents, floor covers, and any other type of protective covering desirable for use by construction contractors.

SUMMARY OF THE INVENTION

In accordance with the present invention, there is provided a new construction protective covering which meets the advantages discussed above. Disclosed is a construction protective covering for covering and protecting delicate finishes on previously installed kitchen and bath countertops and appliances, as well as any other installed components on a construction job site from damage due to dropped tools and construction workers working in the vicinity of the installed components. In addition, a protective covering having at least one integral intermediary sheet of plastic capable of extending therefrom for protecting the face of any installed construction component is also disclosed. The present protective covering includes at least two layers of sheeted materials adhered together to form a double skinned, sheeted material protective covering. A preferred embodiment includes a center plastic sheet material at least partially extending between the double skins.

The material to be preferably used includes at least two layers of corrugated cardboard having a plastic sheeted material adhered therebetween, forming a double skinned sheeted material having a center material between the two skins, with a thickness of from about ⅛" to about 5" thick, and each of the layers may be made of any individual corrugated double skinned sheet materials including corrugated cardboard, plastic, paper, foamed skinned materials or lightweight composites. Although corrugated cardboard is preferred for cost reasons, the corrugated plastic embodiment may be made of polypropylene, polyethylene, or any other commercially available corrugated plastic, so long as it is lightweight and will not mar the surface.

Further, the double skinned sheet material may include a honeycomb construction having individual honeycomb cell sizes of from about ¼" to about 1" diameter. In addition, double skinned sheet material may be used that has two outer skins and foamed materials thereinbetween. Reinforcement materials may be incorporated into the center foam to aid the rigidity of the unit, thereby enhancing the weight bearing capacity of the protective covering. As the reinforcement will not contact the installed fixture surface, it may be of any high strength, yet lightweight material, such as a metal mesh or metallic spun web, both of which are very lightweight and inexpensive.

Various embodiments for other kitchen and bathroom fixtures, such as countertops, appliances, sinks, hot tubs, bidets, water jet tubs, toilets, and any other conventional bathroom fixture which needs protection from workers, can be made from the above described double skinned materials without any undue experimentation, and is contemplated by the present inventors within the scope of this invention.

Although the invention will be described by way of examples hereinbelow for specific embodiments having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different embodiments and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various embodiments of the present invention, reference shall be made to the following detailed description, and when taken in conjunction with the accompanying drawings, in which like parts are given the same reference numerals, and wherein.

DETAILED DESCRIPTION OF THE INVENTION

Figure 1:
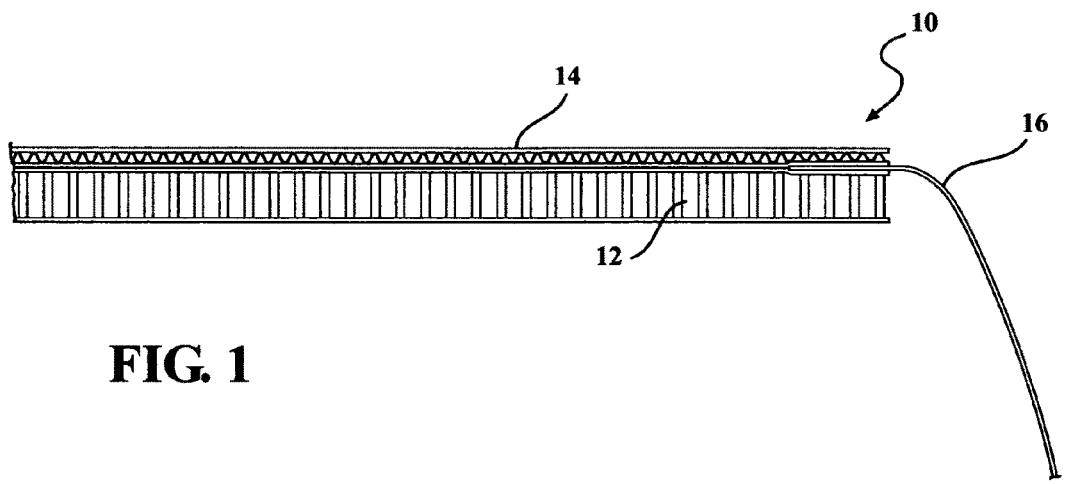
FIG. 1 is a side elevational view of a multi-layer protective covering made in accordance with the present invention.

Looking first to FIG. 1, there is a side elevational cutaway view of a first embodiment of a construction site protective covering made in accordance with the present invention, generally denoted by numeral 10, which is made of a corrugated honeycomb cardboard underlayment 12, and having adhered thereto a corrugated cardboard piece 14. A sheet of plastic 16 may be adhered between the corrugated honeycomb underlayment 12 and the corrugated cardboard piece 14. The inventors have discovered that the combination of the honeycomb underlayment 12 with an adhered upper layer of corrugated cardboard 14 yields a very desirable protective covering, which they sell under their trade name, CORHEX™. CORHEX™ may or may not include an optional plastic sheet 16 as illustrated in FIG. 1. The CORHEX™ material is the basis for most of the construction protective coverings, and may include optional plastic sheets or additional corrugated pieces either on the top or the bottom, and may also include ribbing or texturing on the upper surface and/or reusable adhesive tacky coatings on the bottom. These features may reduce slippage of the covering on the surface being protected.

The base CORHEX™ material described herein is preferably composed of a weight-bearing honeycomb cardboard construction underlayment 12 having from about 10 cells per square foot to about 200 cells per square foot, and is from about ¼" thick to about 5" thick, depending upon the desired application. Other materials suitable for the underlayment 12 of the present invention also include corrugated plastic material, composite wood forms, foamed core construction composites, sandwiched foam core plastics, metal mesh reinforced plastics and/or wood composites, recycled materials, and any other suitable material for the job. While the rest of this patent application will generally speak of the cardboard honeycomb and corrugated cardboard embodiment, it is well contemplated by the present inventors that any of the above mentioned materials could be used as well, in substitution for the cardboard or honeycomb, so long as it will act as a protective covering.

It is very important that the surface of the protective covering which will contact the surface of the item to be protected must be a non-marring material so as not to scratch the item to be protected. In other words, if the protective covering is made of a cardboard material, there cannot be any staples or metallic components that would scratch, for example, a kitchen countertop or toilet cover. The outer surface of the protective covering, that which will contact the construction worker, is preferably made having a surface which is non-slippery and safe for the construction worker to be working on, in, or around. Consequently, if the protective covering is made of a disposable cardboard with a soft, paper exterior of the sheeted skins, then it is expected that the protective covering would not harm the surface to be protected. In addition, a corrugated cardboard upper surface would be able to be stood on by a construction worker without providing an unsafe surface.

In order to increase the safety, it may be advantageous to provide a tacky, upper surface or a sandpaper surface, including non-skid materials, or the surface may be coated with a rubbery material that provides a non-skid surface. In the event that a tacky surface is desired to prevent slippage of the protective covering on the surface of the countertop, sink, or any other item to be protected, it may also be advantageous to include a waxy paper covering which may be peeled away by the construction worker installing it, and thereby providing a means for sticking the protective covering onto the countertops without making a permanent adhesive situation.

It is also contemplated by the present inventors that the materials used for the protective coverings may be water resistant, fire resistant, oil resistant and/or recyclable, depending upon the applications. For the water resistant protective covering, a spray coating is preferably sprayed onto the contacting surface on the protective covering, although a separate plastic sheet may be adhered onto the protective covering. The same arrangement is possible for the other material attributes desired, such as the fire resistance, or the oil resistance, where a coating or an additional sheet of fire or oil resistant material is contacted on the surface of the protective covering.

For instance, in the application of a bathtub covering, the bathtub is installed before the drywall and/or other wall treatments are made. The workers need something to stand on while performing these operations. A thicker component, preferably made of a multi-layer honeycomb configuration, is useful for supporting the weight of up to a 500 pound man, and such a honeycomb design would be preferably about 2½" thick, with a cell count of from about 100 cells/sq. ft. to about 6 cells/sq. ft. in order to support the weight of that man over a large span of unsupported space. An additional corrugated cardboard covering may be adhered to the honeycomb cardboard configuration is preferably a ¼" to 1" thick piece of corrugated cardboard, with flutes having a density of from about 20 flutes/linear inch to about 3 flutes/linear inch. Applicants sell such a structure under the trademark of CORHEX™. In this embodiment, corrugated flutes run horizontally with regard to the CORHEX™ material, while the individual honeycomb cells run essentially vertically for weight support. The honeycomb configuration may also include a separate cardboard piece, similar to the corrugated cardboard piece honeycomb configuration. It may also include a separate cardboard piece, similar to the corrugated cardboard piece 14 of FIG. 1, and may also include a low-tack adhesive on the bottom in order to hold the CORHEX™ piece in place, whether it is being placed on flooring, a countertop, a cooking island or in bathroom appliances.

A preferred embodiment includes a protective covering for construction sites to protect a construction installation having a surface thereon, including at least two layers of corrugated cardboard adhered together and also having a protective sheeted material at least partially adhered between at least a portion of the at least two layers of corrugated cardboard. The protective sheeted material extends outwardly and downwardly therefrom to protect at least portions of the construction installation. In this embodiment, the at least two layers are both made of double skinned ¼" corrugated cardboard with flutes. The first of the at least two layers is preferably made of double skinned ¼" corrugated cardboard with flutes and the second of the at least two layers is made of a vertically oriented corrugated cardboard. Furthermore, the at least two layers may further be adhered together with a plastic sheeted material adhered near one of the edges of the protective covering. This yields a protective covering with a plastic sheeted material extending inwardly from the edge of the covering from about one 1" to about 6". Another preferred embodiment includes a five layer structure including a first ¼" corrugated cardboard layer, a vertically oriented corrugated cardboard layer on top of the first cardboard layer, a second ¼" corrugated cardboard layer on top of the vertically oriented cardboard layer, and a plastic sheeted material is adhered to an edge so that the plastic sheeted material extends outwardly and downwardly when installed. A fifth top layer of ¼" corrugated cardboard is adhered to the top of the plastic sheeted material, wherein each of the layers is adhered across its contacting surfaces to create a five layer structure. The protective sheeted material may be selected from the group consisting of plastic sheets and paper sheets that are made of a plastic sheet from about 2 mils thick to about 5 mils thick.

Referring again to FIG. 1, the basic material CORHEX™ is illustrated with a partially inserted sheet of plastic 16 into the edge of the protective covering 10. Although plastic sheet 16 may extend entirely therethrough, it is advantageously added only at the edges, in some instances, so that the CORHEX™ piece can be easily cut with a utility knife in order to make modifications for various construction applications. The plastic or paper sheet is most advantageous when it hangs down over the front of the cabinets being protected. Plastic sheet 16 is preferably from about a 2 ml to about 5 ml thick polyethylene film that resists puncturing, but may be of any other suitable type of material. The plastic sheet 16 may instead be a sheet of paper which is designed to resist puncturing, and is commonly sold as butcher paper or PolyKraft paper which is a readily available water and tear-resistant durable plastic layer bonded to a heavy-duty paper sheet which also provides excellent protection for floors or countertops on its own. Such a paper sheet may be from about 20 lb. paper to about 100 lb. paper, and is ideal for reducing scuffing, dirt and dust on hard surfaces. Needless to say, such paper and/or plastic sheets may include ribbed or textured surfaces (not shown), as well as adhesives, such as low-tack adhesives, in order for securement in place at desired locations.

Figure 2:
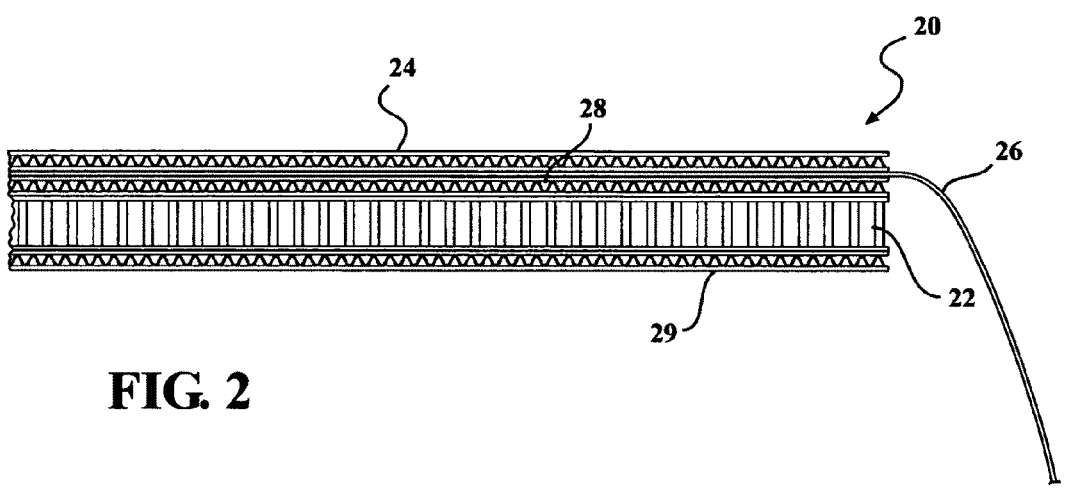
FIG. 2 is a side elevational view of another aspect of the present invention.

Looking next to FIG. 2, there is shown yet another embodiment of the present invention for countertops, cooking islands, and the like, which is generally denoted by the numeral 20. Protective covering 20 may be comprised of a honeycomb corrugated cardboard section 22, having another piece of thinner corrugated cardboard piece 28 adhered thereon. On top of the corrugated cardboard layer 28 is shown a sheeted material 26, which may be either plastic or paper or a combination thereof, and is topped again with yet another corrugated cardboard piece 24 for structural strength. An optional under corrugated cardboard layer 29 may be adhered to the bottom of the honeycomb section 22. As described hereinabove, the top layer may also incorporate a ribbed or textured surface to prevent slippage of the construction workers thereon, and may also include an optional low-tack adhesive on the bottom of the lowermost layer for adhering to the countertops and preventing slipping of the workers.

Figure 3:
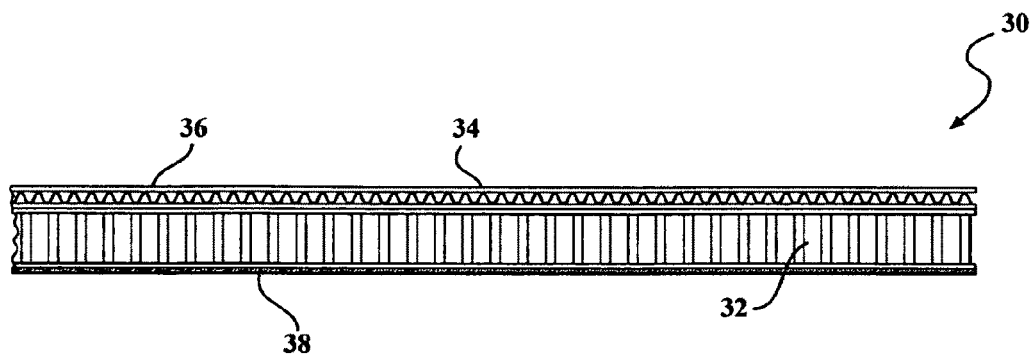
FIG. 3 is a side elevational view of yet another aspect of the present invention.

Next, FIG. 3 illustrates a simple protective covering, generally denoted by numeral 30, in which a honeycomb cardboard support 32 is shown having a single corrugated cardboard layer 34 adhered thereto. Optional texturing and ribbing surface 36 may be applied, if so desired. If used, optional low-tack adhesive layer 38 is preferably adhered to the underside of honeycomb layer 32 for securement and placement. In the event of the utilization of a low-tack adhesive, it would be most advantageous to further include an additional underlayer of waxy release paper covering, adhered to the low-tack adhesive, which can be peeled away by the construction worker before the piece is put into place and secured by the adhesive.

Figure 4:
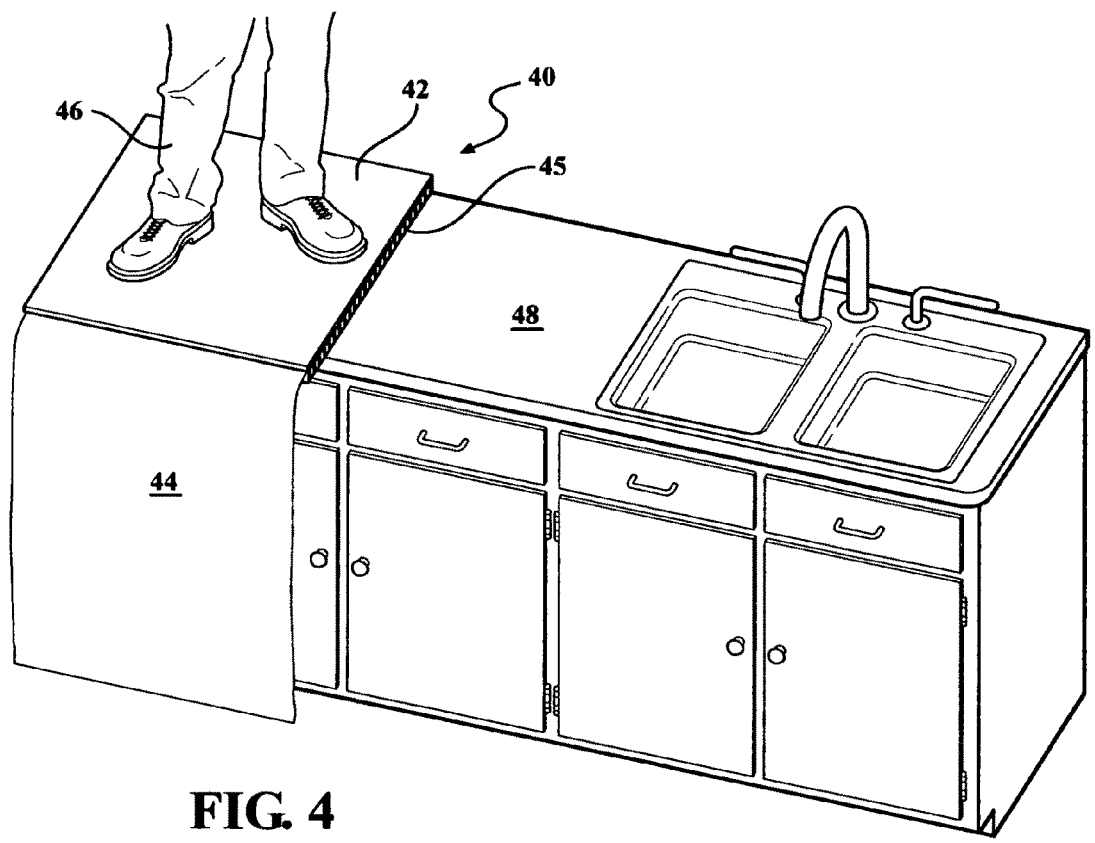
FIG. 4 is a perspective view of the placement of the multi-layer sheeted material in its environment on a kitchen counter with a construction worker standing thereon.

Looking now to FIG. 4, there is shown an environmental view of the most basic form of the counter protective covering, generally denoted by numeral 40, which is also shown in greater detail with regards to FIG. 1 hereinabove. Counter protective covering 40 includes a top layer of corrugated cardboard 42 and preferably has a sheet of polyethylene 44 extending therefrom. The honeycomb underlayment 45 is shown placed on top of countertop 48 of a traditional kitchen cabinet. Construction worker 46 can easily stand on the counter protective coating 40 and the weight-bearing aspect of the protective covering 40 will easily hold his weight without knicking, scratching or denting the countertops thereunder. Polyethylene sheet of material 44 is advantageous as painting contractors will not be able to splash or overspray their paint onto the countertops. Although FIG. 4 illustrates only one piece of counter protective covering in place, it is envisioned by the inventors that the entire counter will be most advantageously covered with such protective coverings, thereby providing the maximum coverage.

The uses for the basic CORHEX™ material are preferably for over bathtubs, countertops and floors, as these are all horizontal applications and require the greatest amount of weight support capacity. The bathtub application is disclosed in U.S. patent application Ser. No. 10/163,778 filed 06 JUN 2002, which is incorporated herein by reference. Although the instant drawings do not illustrate the CORHEX™ material over a bathtub, it is shown in the drawings of the above-referenced patent application. In the instance of bathtubs, the fundamental CORHEX™ material is shown in FIGS. 3 and 4, and may advantageously utilize a plastic, paper or cardboard apron for covering the front face of the tub, while providing a weight-bearing structure over the open hole of the tub. Besides protecting the surface of the tub, this provides a standing surface for a drywall or painting contractor to complete the surround around the tub, and also will act as a work surface. The protective covering 30 will prevent any knicks or scratches in the event that any of the contractors drop any of their tools while working above the tub. Further, a plastic sheet material acting as an apron over the front face of the tub may prevent overspray and/or other material damage to the tub face itself. Likewise, the basic CORHEX™ material may include sheets of plastic or paper to cover cabinet faces in the application of utilizing the core material on a countertop. As the core material can easily be modified by the utilization of a utility knife, this material can cover and protect all makes, models, styles and sizes of bathroom fixtures. Furthermore, it prevents bathtubs from being used as trash bins or other receptacles by construction workers, which homeowners generally find displeasing when they enter the home.

While the inventors herein also envision the utilization of corrugated plastic materials, the corrugated cardboard materials having a high pulp content are especially preferred because they are not only lightweight, durable and weight-bearing, but they are also 100% recyclable, and therefore are landfill compliant. Those materials generally provide a non-scratching surface. This is of great concern to construction companies and builders these days, as the disposal of any construction site waste incurs tipping fees in landfills can become very high, cutting down on their overall profits.

Figure 5:
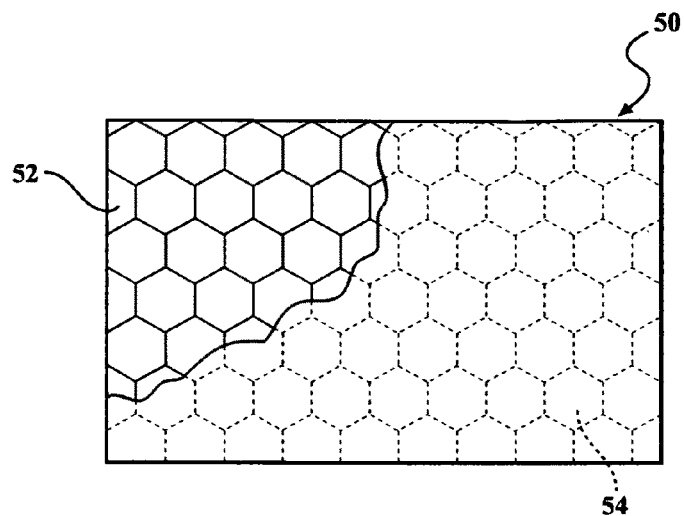
FIG. 5 is a top plan cutaway view of the honeycomb construction for one embodiment of the present invention.

Looking now to FIG. 5, there is shown a general honeycomb configuration multiple cell panel which is especially useful in the manufacture of the CORHEX™ material described herein. Such a honeycomb configuration, generally denoted by numeral 50, includes honeycomb cells 52 with a light-weight paper enclosure, approximately 10 lb. Kraft paper to about 30 lb. Kraft paper weight. Material 54 encloses the cells. The corrugated paper proposed in this present invention to finalize the manufacture of the CORHEX™ material is generally of a ¼" to ½" thick corrugated cardboard generally available in the mainstream commercial activity.

Figure 6A:
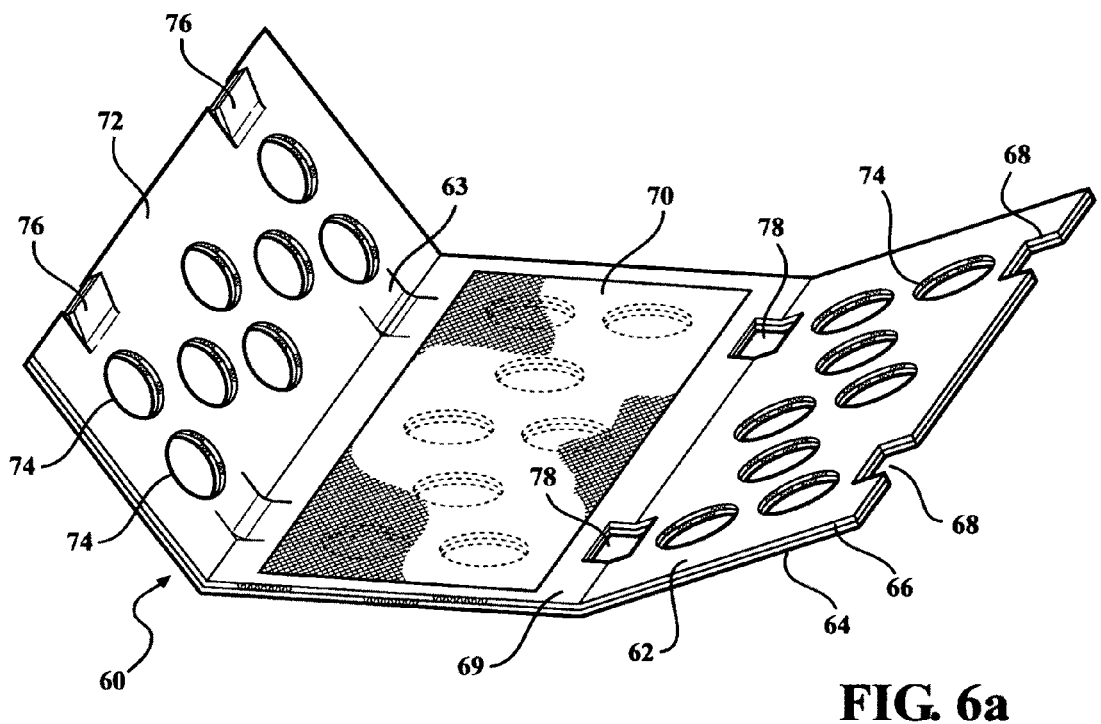
FIG. 6a is a perspective view of an air duct heating ventilator protective covering.
Figure 6B:
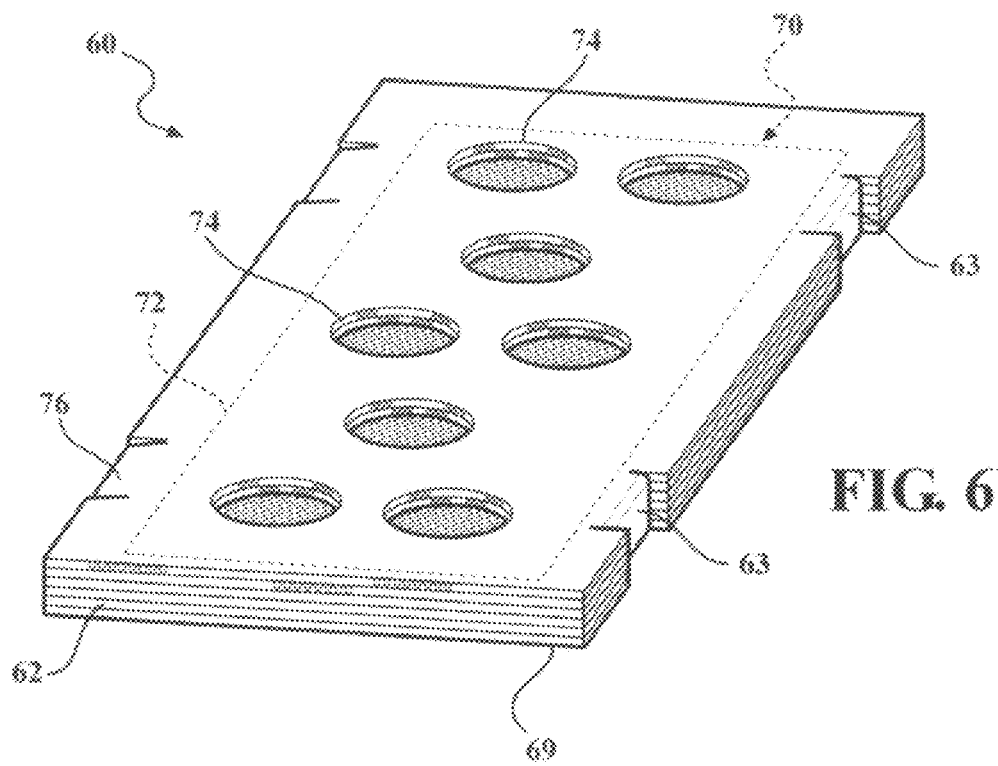
FIG. 6b is the air duct heating ventilator protective covering of FIG. 6a in a closed position.

Looking now to yet another embodiment of the present invention, FIG. 6a utilizes a single or double layer of corrugated cardboard or plastic which is die-cut to form an air duct heating ventilator protective covering, generally denoted by numeral 60, which includes a tri-fold application in order to trap and hold a filter mat material piece 70 therein. Needless to say, a multi-layer corrugated piece of cardboard or plastic with vent holes having a mat glued between the layers is also contemplated by the present inventors. This piece will be generally denoted by the trademark VENTWRAP™ and is available from the inventors herein. The VENTWRAP™ 60 generally includes a first flap 62 preferably is comprised of upper and lower layers of two ¼" corrugated cardboard layers adhered together, 64 and 66, respectively. Notches 68 are cut into the flap 62 in order to help with air flow. Folding portions 63 are die-cut into the corrugated cardboard assembly 60, and allow the second flap 72 to be folded over filter mat material 70 and allow second flap 72 to be folded down over first flap 62. Securing notches 76 fit into vent orifice 78, once the tri-fold has been folded and compacted into the piece as shown in FIG. 6b. Vent holes 74 are placed intermittently throughout each of the flaps and allow for air passage once the VENTWRAP™ is in place over an air ventilation hole. The VENTWRAP™ provides a filter barrier which keeps foreign objects, such as screws, lumber, scraps, drywall, dust and other materials, from falling into the air vents. Prior art air vent covers tended to have insufficient air flow therethrough, and actually have shut off furnaces in newly constructed homes. The present VENTWRAP™ has more than sufficient net free area for air flow, and is easily installed with common wood screws into the wooden floor underlayment before the flooring is installed. It can be easily removed when the floor has been placed. This VENTWRAP™ will support the weight of a construction worker, thereby providing protection from injuries which are commonly associated with open and/or uncovered vents. Although the VENTWRAP™ is very durable and may be reused if carefully taken from the last job, they are completely disposable and eliminate expensive post-construction cleanup of duct work in air vents. The tri-fold design assembles in seconds and can be installed just as quickly with a power screwdriver. The multiple fold design allows for air to come up from the air vent, flow up through vent holes 74, be filtered through filter mat 70, and come through the flutes of the double layer of corrugated cardboard 64 and 66.

FIG. 6b shows the tri-fold design once it has been compacted, and protective covering 60 is shown with filter mat material 70 in phantom, as it is held between the various folds of the tri-fold design. Vent holes 74 are shown as the air comes up and can filter sideways out through the various layers of the first and second flaps, 62 and 72 respectively. The die-cut folds 63 hold the assembly together, and they are shown in greater detail in placement in FIG. 7.

Figure 7:
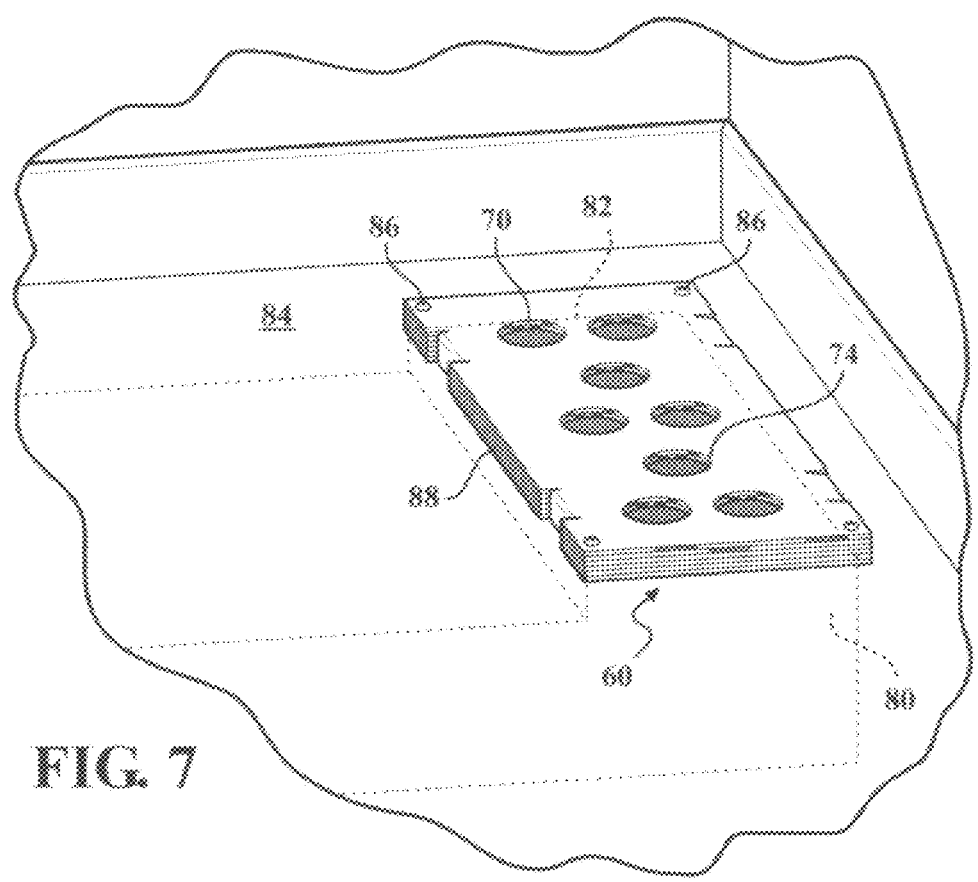
FIG. 7 is the air duct heating ventilator protective covering of FIGS. 6a and 6b shown in its environment covering an air duct.

FIG. 7 illustrates the environment of an installed VENTWRAP™ as described in the earlier two figures, and shows the VENTWRAP™, generally denoted by numeral 60, secured in place on subflooring 84 with wood screws 86 at each of the corners. Vent holes 74 allow the air to be filtered from filter mat 70 up through from air vent 80. At the top of air heating duct vent 80, there is a vent hole in the floor shown in phantom as element 82. As the air rises from air vent 80 through vent hole 82, it goes through filter mat 70 and can either come into the room via vent hole 74 or sideways through the flutes of the corrugated cardboard 88.

Figure 8:
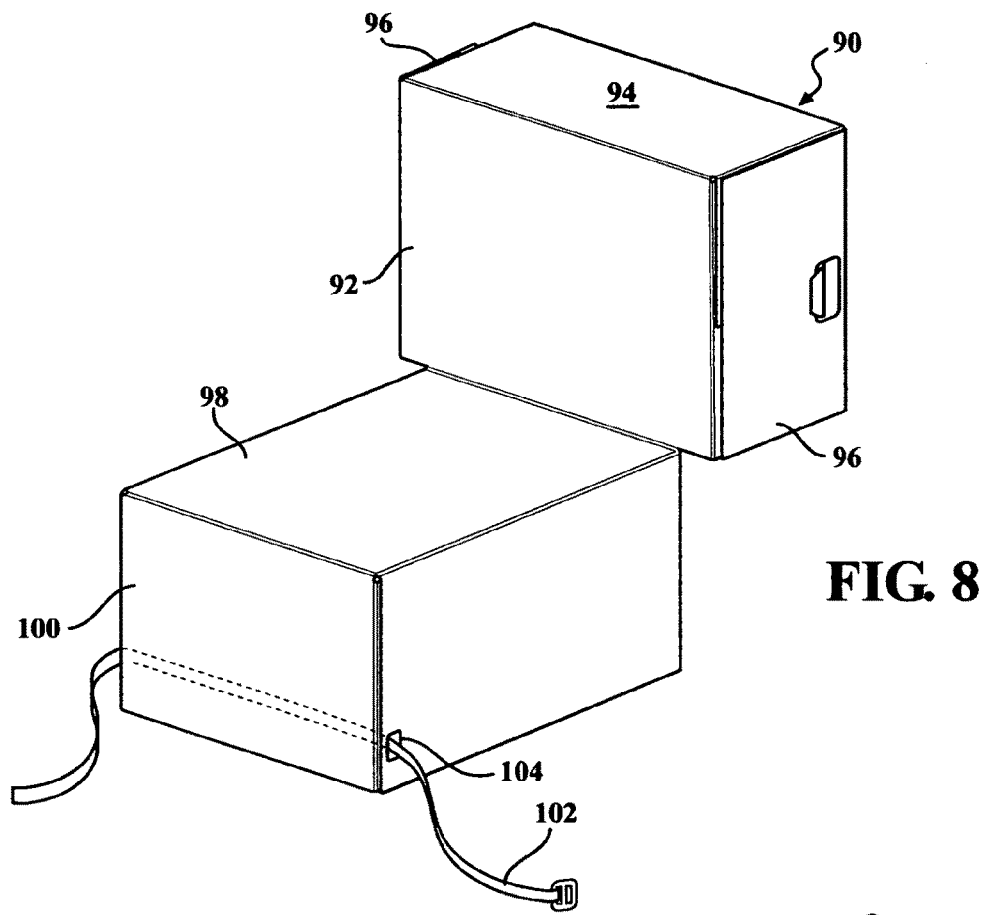
FIG. 8 is a front perspective view of a toilet protective covering.

Looking next to FIG. 8, there is shown yet another aspect of the present invention including a toilet protective covering generally denoted by the numeral 90, including a tank cover 92 and a toilet bowl cover 98. Toilet tank covering 92 is formed by die-cutting a single piece of cardboard and forming flaps 96 which are adhered together with an adhesive. A work surface 94 is formed thereon which preferably includes thereunder a honeycomb configuration to allow standing thereon. The honeycomb configuration is shown in greater detail hereinbelow. The toilet bowl cover 98 may include a toilet bowl cover front flap 100. A commercially available locking strap 102 is preferably included and is advantageously placed through perforations 104 on either side of the toilet bowl cover 98. Locking strap 102 is preferably a locking cable tie long enough to reach under the toilet bowl, but may be any suitable type of strap, including elastic cords, ropes, locking ties, or any other type of commercially available locking strap.

The inventors call this invention their TOILETWRAP™, which deters the use of a toilet by contractors, helping eliminate expensive cleanup costs which are associated with unauthorized use of toilets. If a locking strap is utilized, the tank cover locks on with the locking strap to discourage use of the toilet during all phases of construction and is adapted to fit any size of toilet. The TOILETWRAP™ 90 will cover, protect and double as a work surface. Further, the name of the builder can be printed onto the tank top, in order to achieve brand name recognition, and warnings signs such as "Stop: Do Not Use" may also be printed on the top of the toilet bowl cover 98. Unauthorized toilet use has been a long-standing problem with contractors, and new homeowners come into their brand new home expect it to be pristine, and not having to clean out the toilets. This highly undesirable situation can easily be eliminated by using the TOILETWRAP™, while also securely protecting the fixtures from nicks, dents, overspray, caulk, and the like from construction workers finishing the bathroom after the toilet has been installed.

Figure 9:
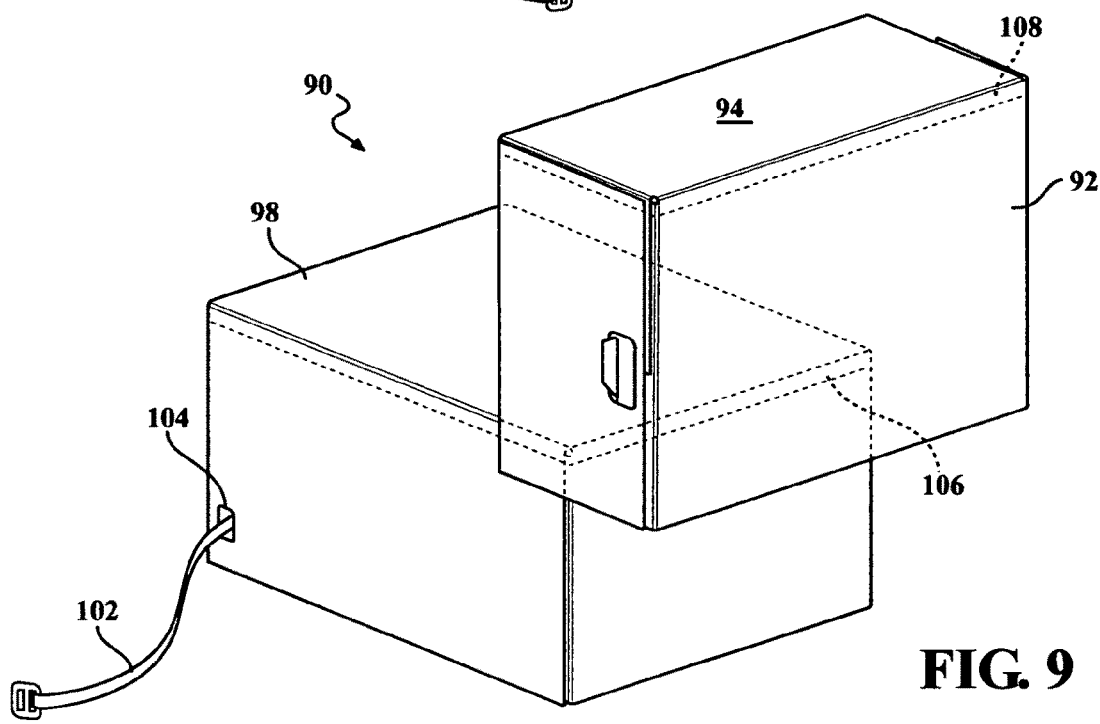
FIG. 9 is a rear perspective view of the toilet protective covering of FIG. 8.

FIG. 9 illustrates the TOILETWRAP™ 90 from behind to illustrate the relative placement of optional work and body supporting honeycomb portions 106 and 108, respectively, under the toilet bowl cover 98 and toilet tank covering 92. If utilized, honeycomb 108 may form a work surface under the upper work surface 94, and provides support for a contractor to stand on top of toilet bowl cover 98 due to the honeycomb weight-supporting portion 106 thereunder.

Figure 10:
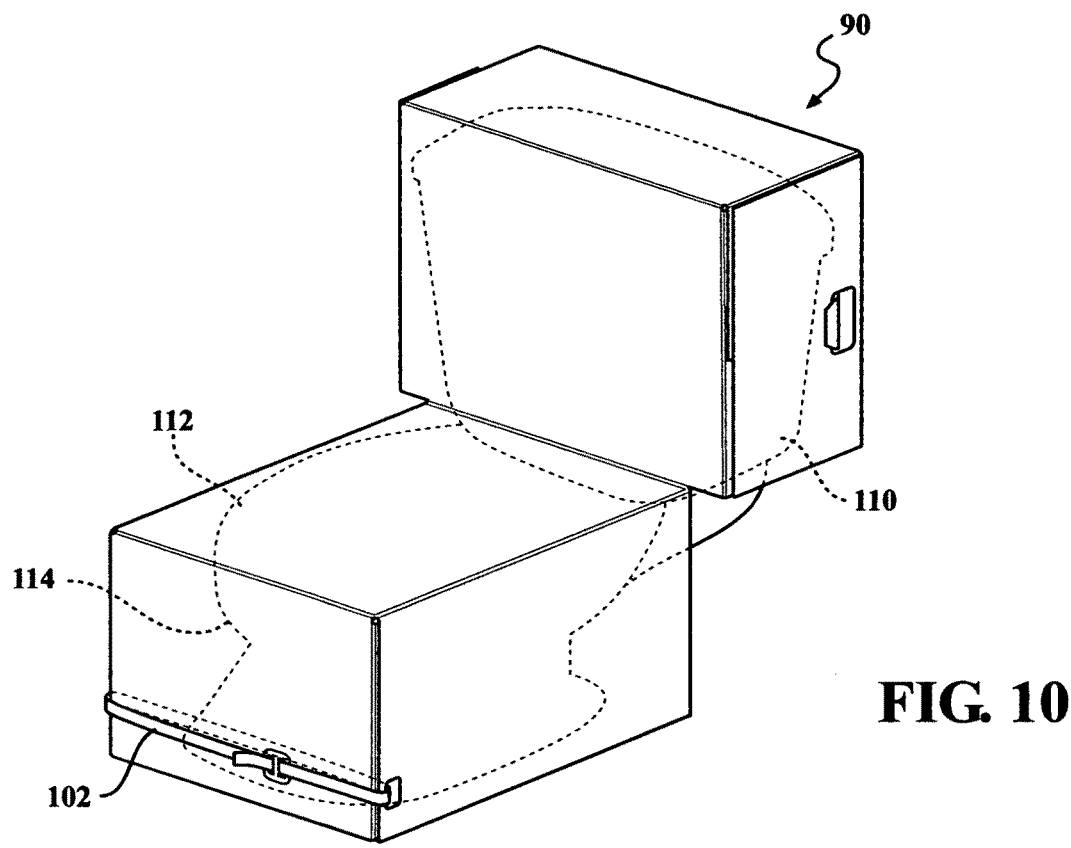
FIG. 10 shows a front perspective view of the toilet protective covering of FIGS. 8 and 9, but including a locking strap.

FIG. 10 illustrates the preferred embodiment of the TOILETWRAP™ 90 installed over a standard toilet tank 110 and toilet bowl 112. Toilet bowl 112 includes an underside 114 which can receive the locking strap 102 in order to lock down the TOILETWRAP™ 90, here shown as a cable tie. Once the tank cover 92 has been slipped over the toilet tank 110, and cable tie 102 is secured under the underside 114 of toilet bowl 112, it would be very difficult for someone to utilize the toilet without clipping off the cable tie and disassembling the entire unit. This will act as a discouragement for contractors to use the toilet.

Figure 11:
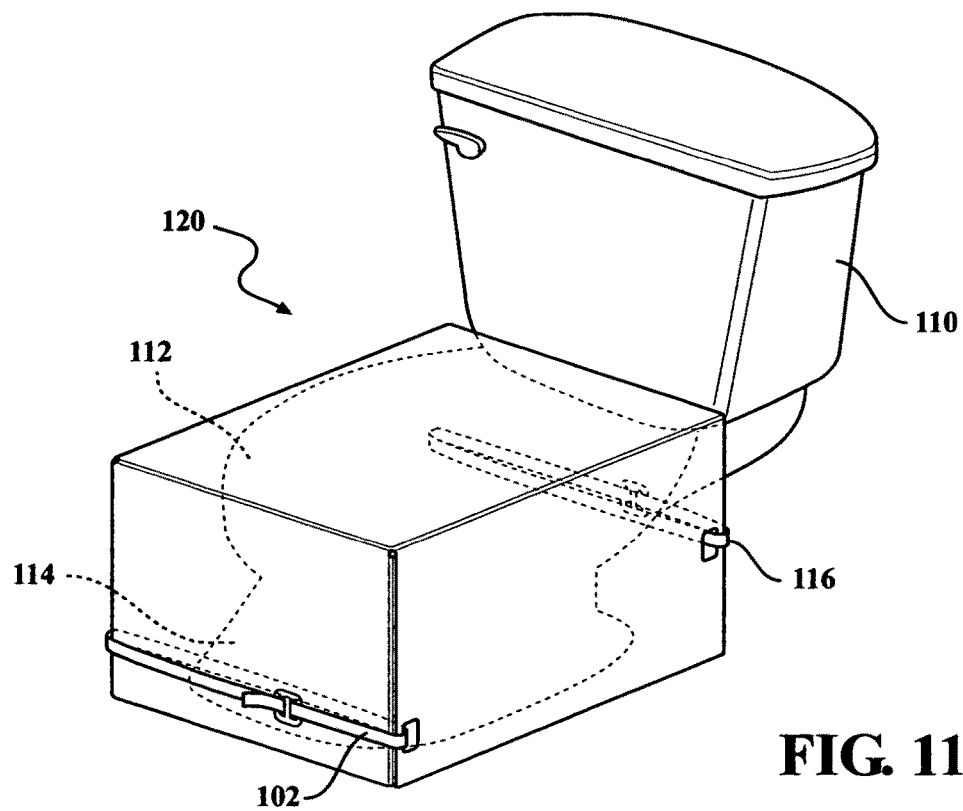
FIG. 11 is a front perspective view of yet another embodiment of a toilet wrap made in accordance with the present invention.

FIG. 11 shows yet another embodiment of the TOILETWRAP™, generally denoted by the numeral 120, in accordance with the present invention, which includes merely a cover 112 to go over toilet bowl 114. This is different from the last described embodiment because there is no cover for the toilet tank, as this embodiment only goes over the toilet bowl. An additional locking strap, shown here as a cable tie 116, extends backwardly and goes under toilet tank 110. When the front cable tie 102 is secured and the back cable tie 116 is secured, the toilet bowl cover 112 discourages use of the toilet by unauthorized personnel. It must be noted that the locking system of locking straps 102 and 116 may be made of traditional cable ties or may be some other readily available type of tie strap, rope, elastic or string in order to go around the back of the bowl. The securing device described may be anchored to the corrugated TOILETWRAP™ 120 through die-cut holes in the corrugated toilet bowl cover 112.

Figure 12:
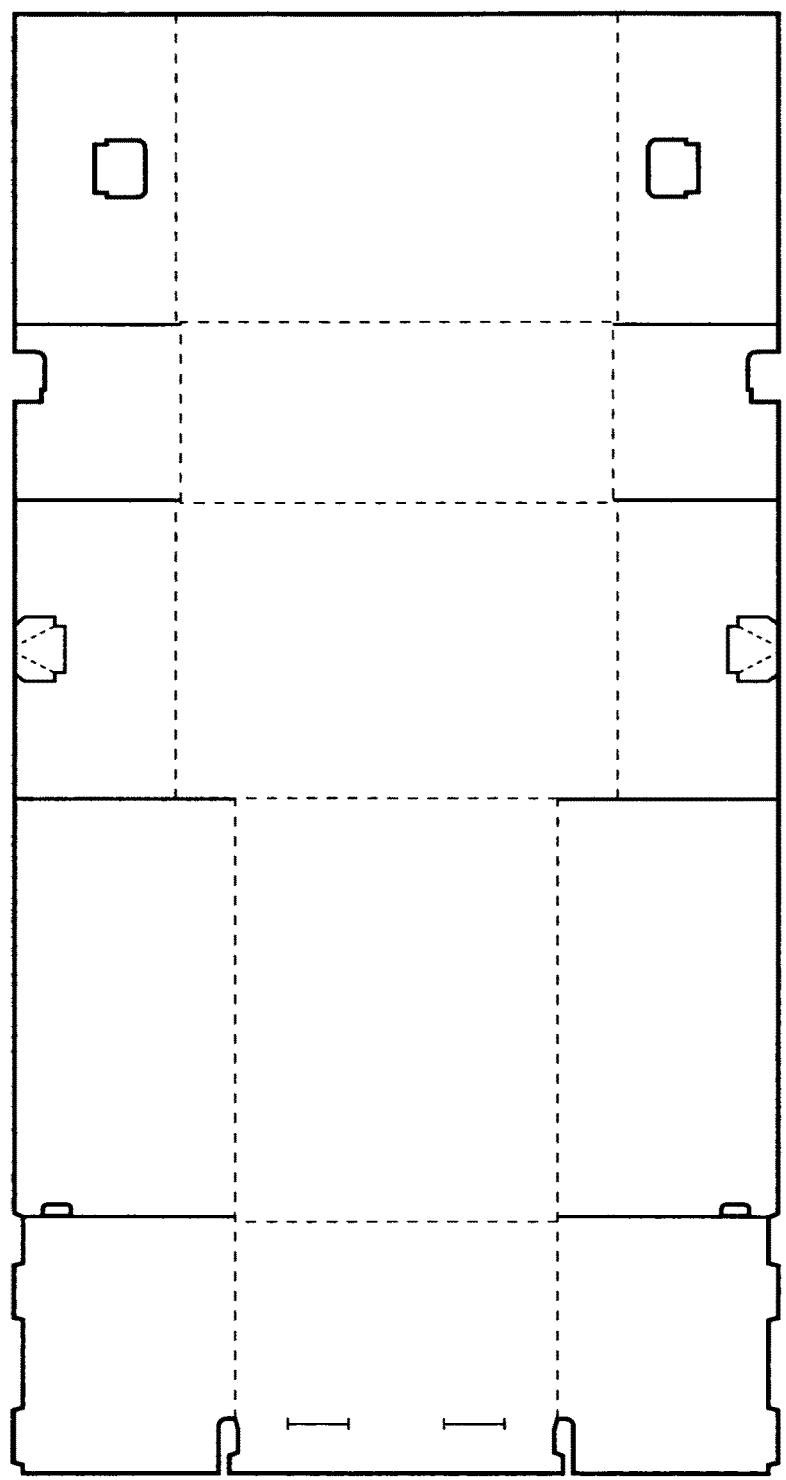
FIG. 12 is a top plan view of a die-cut piece of corrugated material for shaping into a toilet protective covering.

FIG. 12 illustrates a die-cut lay-out of a preferred embodiment of the present TOILETWRAP™ 90 invention, and shows a die-cut cardboard container as it will be cut from a single piece of cardboard. A corrugated cardboard of the main portion is preferably a ⅛" to 1" thick piece of corrugated cardboard, as is commercially available in the art, and further includes two separate honeycomb reinforcement sections adhered to the main cardboard construction as illustrated in FIG. 9, and shown herein with reference to FIG. 12 under the tank top and under the seat portion. When folded and glued together in the appropriate places, the toilet protective covering of FIGS. 8-11 will be realized.

Figure 13:
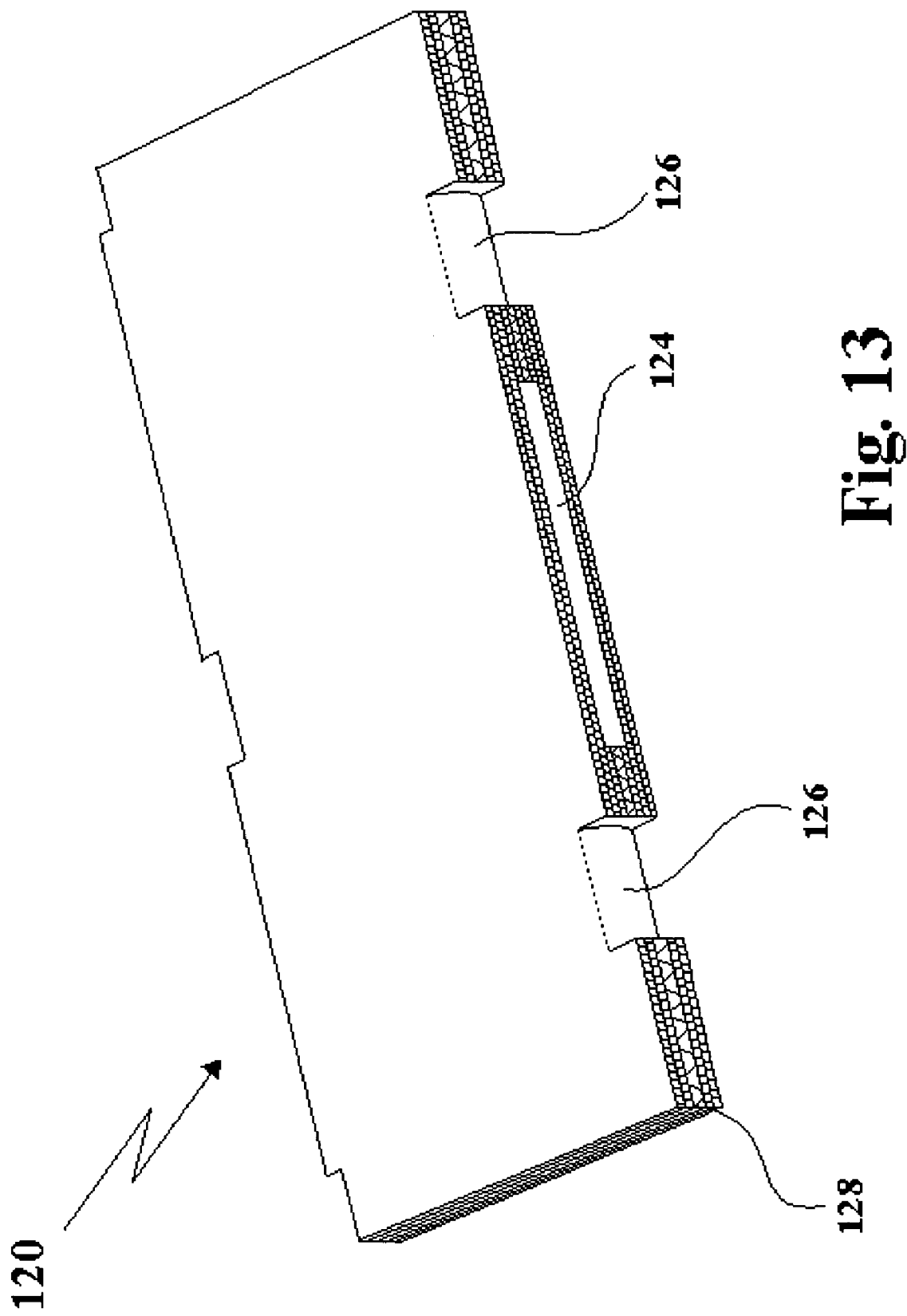
FIG. 13 is a top perspective view of the air vent covering in an assembled form.

Looking next to FIG. 13 there is shown another embodiment for our air duct vent wrap covering generally denoted by the numeral 120. This embodiment does not require the use of a filter mat. Vent wrap 120 includes a solid top portion 122 which defines a die-cut air passage 124 located therebelow. Die-cut living hinges 126 enable the assembly of the vent wrap from a single sheet of corrugated material. The individual air holes defined by the corrugated material include air passages 128 which provide further air passage net free area in addition to the die-cut air passages 124. A fully laid out and unassembled die-cut vent wrap 120 is shown in further detail with regards to FIG. 14.

Figure 14:
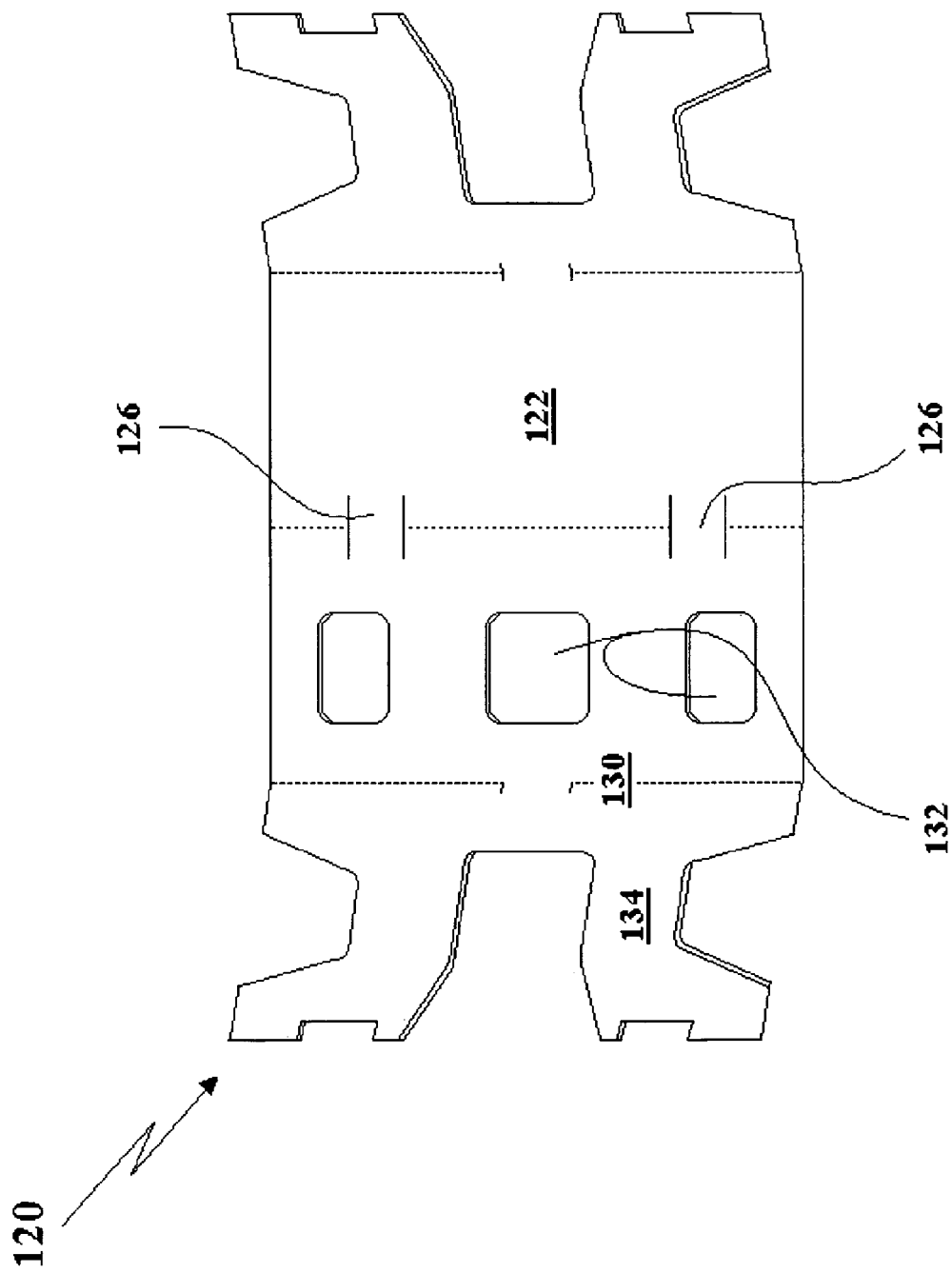
FIG. 14 is a laid open top plan view of a die-cut cardboard air duct covering.

Looking next to FIG. 14, vent wrap 120 is shown in an unfolded and unassembled configuration wherein there are four sections: 1) the solid top portion 122; 2) the air passage bottom portion 130; 3) the first die-cut folding section 134; and, 4) a second die-cut folding section 136. Die-cut bottom air passages 132 have been cut through the air passage bottom portion 130 so that when the vent wrap is placed downwardly on top of the vent, the air can come up through the die-cut bottom passages 132 and exit through the air passage sections cut into the first and second die-cut folding sections 134 and 136, respectively. Die-cut living hinges 126 allow for the formation of the constructed vent wrap from a single piece of corrugated material. Of course, the vent wrap 120 may be made of any number of layers, as long as it can support weight.

Figure 15:
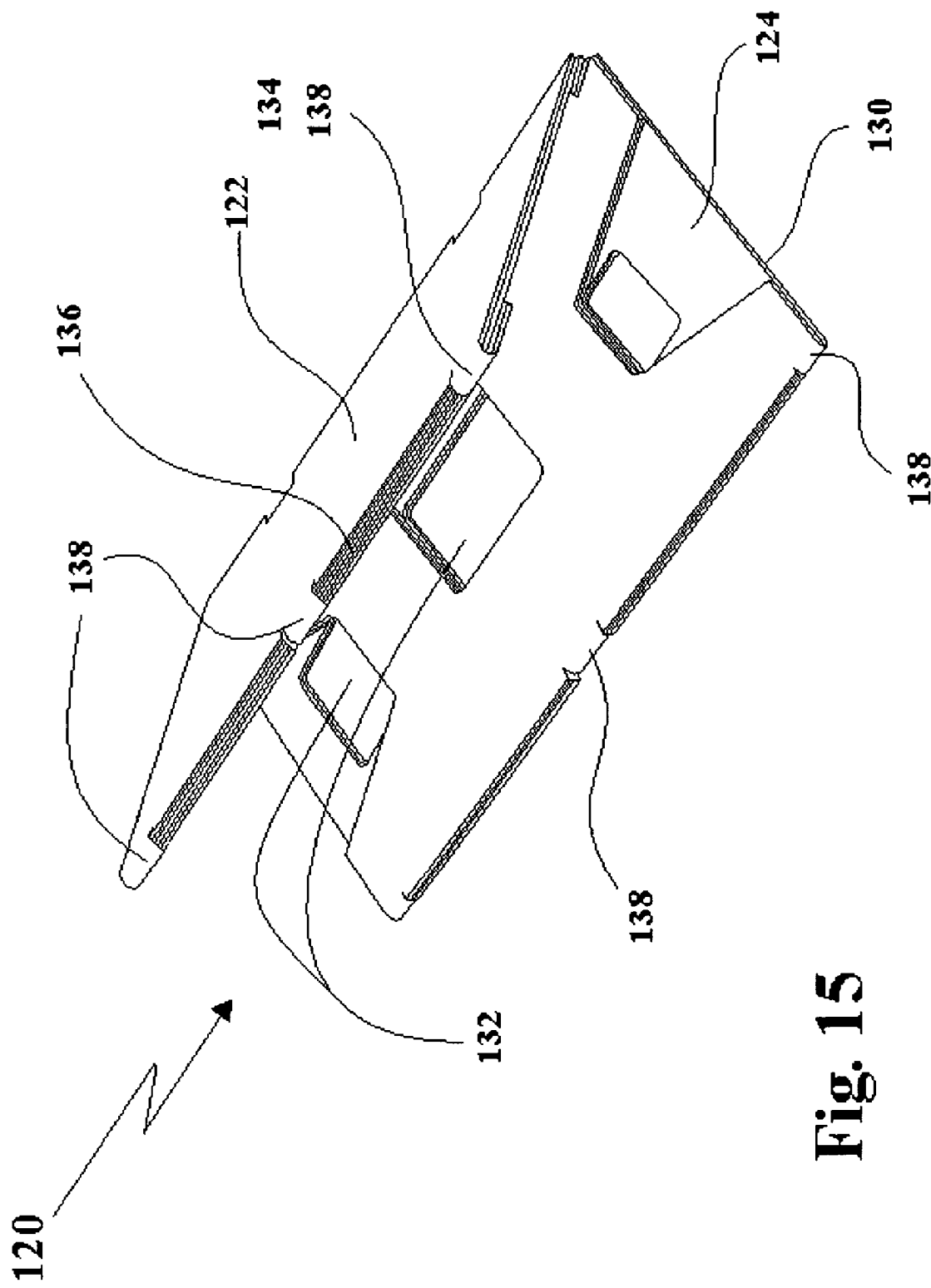
FIG. 15 is a top perspective view of a partially folded air duct covering.

Looking next to FIG. 15, there is shown a top isometric view of a predominantly folded and constructed vent wrap illustrating the solid top 122 having living hinges 138 die-cut therein. The first and second die-cut folding sections 134 and 136, respectively, have been folded in towards the center, and partially form the die-cut passages 124 in those sections. Air passages 132 which have been cut into bottom section 130 extend upwardly and allow air to pass from the air duct up through air passages 132 and out the sides through die-cut passages 124. In addition, air passages through the corrugated material further add to the net free area and allow greater air flow therethrough.

Figure 16:
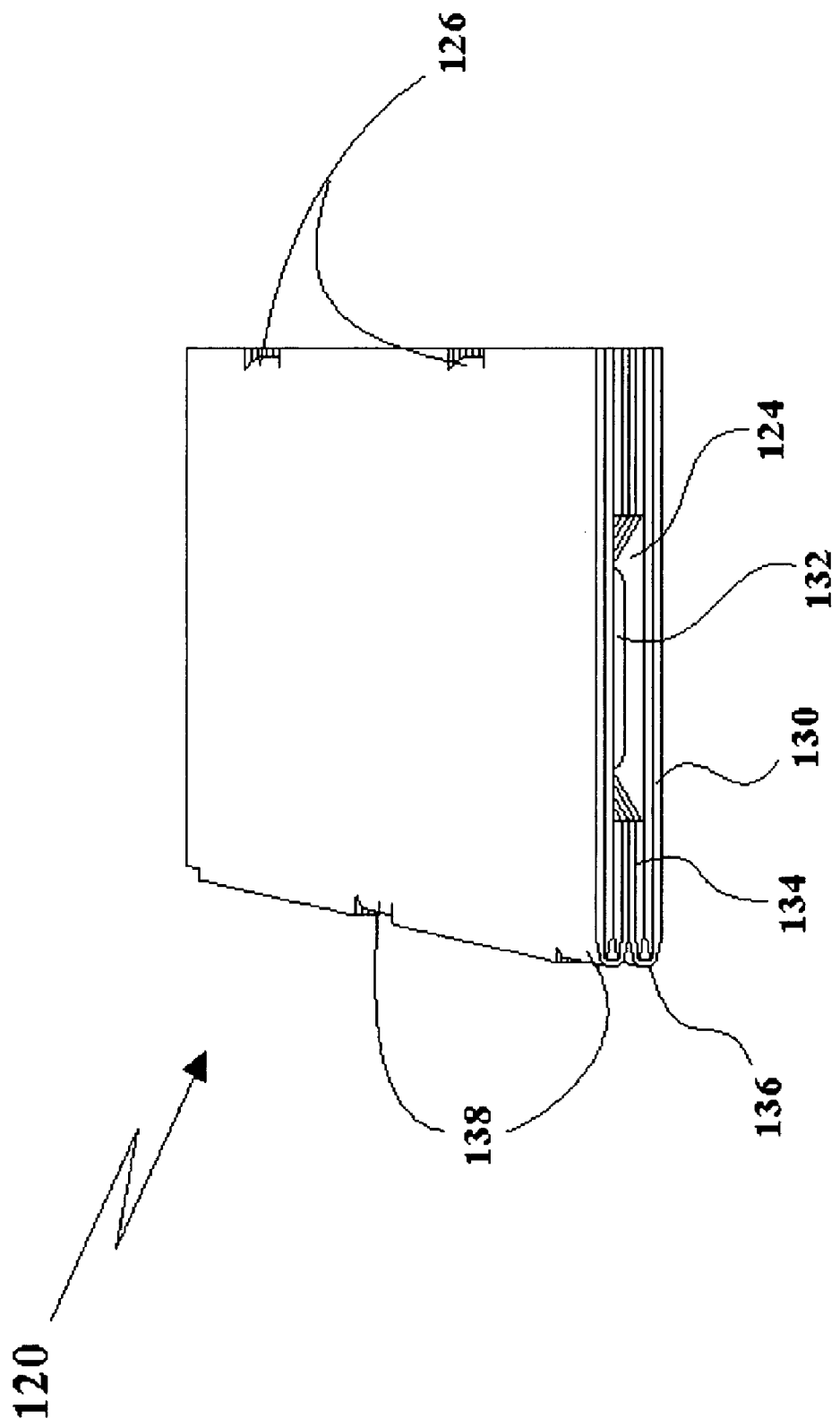
FIG. 16 is a side perspective view of the air duct covering in a fully folded state.

FIG. 16 illustrates a top isometric view of the folded and constructed vent wrap 120 showing the solid top section 122 and the relative placement of living hinges 126 and die-cut living hinges 138. The relative placement of the first and second die-cut folding sections 134 and 136 respectively are illustrated in relation to bottom portion 130 and solid top 122. As one can see from FIG. 16, die-cut air passages 124 are large enough to provide full air flow from the furnace, while the corrugated material of vent wrap 120 will act to sufficiently support the weight of any man which could stand thereon.

Figure 17:
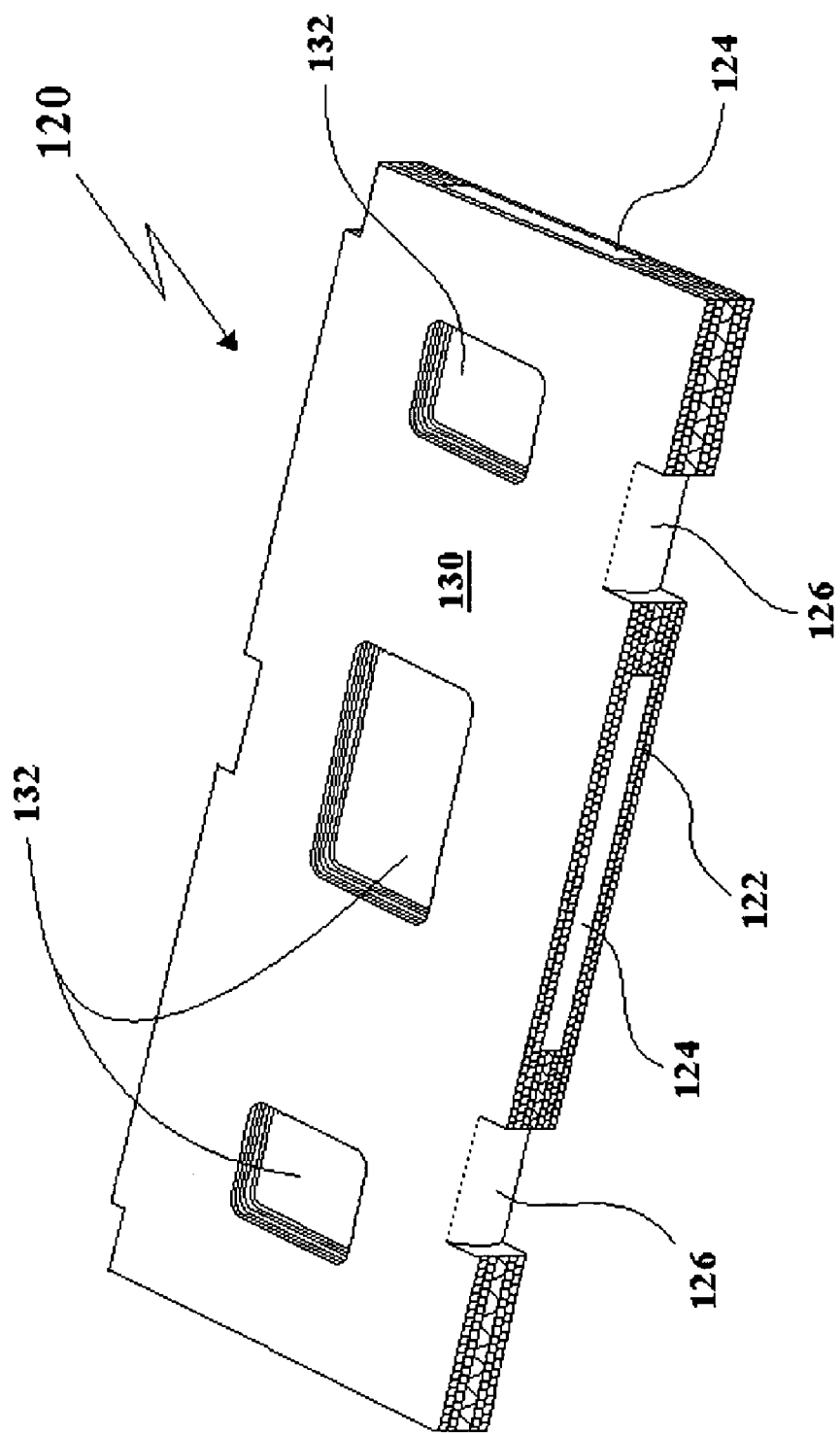
FIG. 17 is a perspective view of yet another side of the air duct covering.

FIG. 17 shows a bottom isometric view of vent wrap 120 showing the bottom portion 130 in an upwardly facing configuration. The die-cut bottom passages 132 are shown as leading out to the edge through die-cut air passages 124. Again, living hinges 126 allow for the construction of the ultimate vent wrap 120, and provide for a precisely flat configuration when it is folded into place.

Another embodiment of the present invention includes an air duct ventilator protective covering for protecting construction workers and the air ducts from foreign objects, including at least one layer of corrugated material having vent holes therein for covering an air duct heating ventilator opening to prevent construction workers from stepping into the ventilator opening and to prevent foreign objects from falling into the ventilator opening, said at least one layer of corrugated material being capable of supporting the weight of a man, and wherein the vent holes allow open communication of air between the air duct and the ambient roof atmosphere so that when the heater blows air through the ventilator, there is substantially no blockage for air passage. The air duct ventilator protective covering may be made of a corrugated material including ¼" corrugated cardboard that is die-cut to be foldable into the resulting air duct protective cover, whereby multiple layers of corrugated cardboard end up on top of each other to yield a strong support for supporting a man. A piece of filter mat material may be located between the folds of the die-cut corrugated cardboard.

The corrugated material may be die-cut to be foldable forming air passages perpendicular to the direction of air flow out of the ventilator, and the corrugated material may be a double layer of ¼" corrugated material.

Yet another embodiment of the present invention includes a toilet protective covering to cover a toilet and deter use of a toilet, comprising a die-cut piece of corrugated material capable of being folded into shape for securement around a toilet component. The die-cut corrugated material may be adapted to be capable of being folded into a shape to cover the toilet bowl, or the bowl and the toile tank, and may be secured around the periphery of the toilet bowl. This embodiment may further comprise a locking device selected from the group consisting locking straps, locking cable ties, ropes, and elastic cords.

Therefore, there has been provided, in accordance with the present invention, a functional piece of constructive protective covering for heating and ductwork, constructed of corrugated materials, including corrugated cardboard, corrugated paper, corrugated plastic, wood, or any other material which has air passages therein and can be die-cut for the vent wrap configuration. In accordance with the present invention, there has been further disclosed a series of construction protective coverings for countertops, bathtub tops, jacuzzi and spa tubs, heating duct vent openings, and toilets. The basic CORHEX™ material has been disclosed and may be utilized for any of these applications or any other desired applications in the construction industry. It has been found that the CORHEX™ material can be utilized on appliances, cabinets, over vent holes in floors, covering the floors themselves after expense flooring has been installed, staircase openings, and any place where a construction worker might fall or trip or otherwise hurt himself.

The foregoing description of a preferred embodiment of the invention has been presented for purposes of illustration and description. It is not intended to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated. It is intended that the scope of the invention be defined by the claims which are appended hereto.

What is claimed is:

1. A protective covering for construction sites to protect a construction installation, such as a cabinet, having a surface thereon, comprising:

at least two layers of corrugated material bonded together having a collective thickness of from about ½" to about 5" thick; and a protective sheeted material at least partially adhered between at least a portion of the at least two layers of corrugated material, said protective sheeted material extending outwardly and downwardly therefrom to protect at least portions of the construction installation;

wherein said protective covering is adapted to be custom cut on-site easily for post-forming the covering to any specific particular size and configuration of the construction installation being covered, wherein each of the at least two bonded corrugated material layers includes a double skinned sheet material made of a corrugated material selected from the group consisting of corrugated cardboard, corrugated paper and corrugated plastic, including corrugated polypropylene and polyethylene, and wherein one of the at least two layers of corrugated materials is a vertically oriented corrugated rigid sheet material constructed in a honeycomb configuration having an individual cell size of between about ¼" to about 1" and is from about 1" to about 5" thick, such that the protective sheeted material covers and drapes over the front of the construction installation to prevent nicks, scratches and spills from damaging the installation.

2. The covering of claim 1, wherein the at least two layers are both made of double skinned ¼" corrugated cardboard with flutes.

3. The covering of claim 1, wherein the first of the at least two layers is made of double skinned ¼" corrugated cardboard with flutes and the second of the at least two layers is made of a vertically oriented corrugated cardboard.

4. The covering of claim 1, wherein the at least two layers are adhered together with a plastic sheeted material adhered near one of the edges of the protective covering, wherein the plastic sheeted material extends inwardly from the edge of the covering from about one 1" to about 6".

5. The covering of claim 1, further comprising a five layer structure including a first ¼" corrugated cardboard layer, a vertically oriented corrugated cardboard layer on top of the first cardboard layer, a second ¼" corrugated cardboard layer on top of the vertically oriented cardboard layer, a plastic sheeted material adhered to an edge so that the plastic sheeted material extends outwardly and downwardly when installed, and a fifth top layer of ¼" corrugated cardboard on top of the plastic sheeted material, wherein each of the layers is adhered across its contacting surfaces to create a five layer structure.

6. The covering of claim 1, wherein the protective sheeted material is selected from the group consisting of plastic sheets and paper sheets.

7. The covering of claim 1, wherein the protective sheeted material is made of a plastic sheet from about 2 mils thick to about 5 mils thick.

* * * * *